Oct. 3, 1944.                C. H. O. WITTIG                2,359,702
                           OPTICAL INSTRUMENT
                           Filed July 1, 1943

CARL H.O. WITTIG
INVENTOR
BY
ATTORNEYS

Patented Oct. 3, 1944

2,359,702

UNITED STATES PATENT OFFICE 2,359,702

OPTICAL INSTRUMENT

Carl H. O. Wittig, Irondequoit, N. Y., assignor to Bausch & Lomb Optical Company, Rochester, N. Y., a corporation of New York Application July 1, 1943, Serial No. 493,013

5 Claims. (Cl. 88—34)

This invention relates to optical instruments and more particularly to an adjustable lens mounting for field glasses, binoculars, and the like.

The object of this invention is to provide a lens mounting by means of which the lens is capable of being adjusted along perpendicular and longitudinal axes, relative to the optical axis of the lens, each one of these adjustments being independent of the other.

In the now preferred practice of mounting objective lenses in optical instruments such as binoculars, the inner surface of the body member is formed with an annular seat upon which the objective assembly is mounted. The objective assembly generally comprises an eccentric adjusting ring carrying the objective and which is nested in a second eccentric adjusting ring to be mounted on the seat of the body member. To insure that the optical axis of the objective carried by one of the rings will remain parallel to the optical axis of the other optical elements of the instrument in all adjusted positions of the rings, the body member is formed with an annular bearing surface accurately machined perpendicular to a reference plane determining the optical axis of the other elements of the instrument and engaged by a similar surface formed on the outer ring of the objective assembly. The objective is then moved in a plane perpendicular to the optical axis of the other elements of the instrument by rotating the rings either relative to each other or as a unit relative to the body member to bring the optical axis of the objective into concentricity with the optical axis of the other elements of the body member.

In the assembly operation, as it is difficult to hold the focal lengths of the objectives constant, each objective was marked with its focal length. If the focal length was different from that for which the seat was bored, it has been necessary to either rebore the body member to compensate for the objective having a short focal length or place shims or spacing members on the seat if the focal length of the objective was too long. This has complicated the assembly of the objective with the body member and has greatly increased the manufacturing costs of precision instruments.

The present invention obviates these difficulties for the eccentric adjusting rings are mounted for relative longitudinal movement so that the objective can be moved longitudinally of the optical axis of the other elements of the body member. In the embodiment of the invention now preferred, each ring is formed with concentric threaded surfaces for adjusting the rings longitudinally of each other. The rings are held in aligned positions as they are longitudinally moved by means of concentric bearing surfaces accurately machined so that they will be perpendicular to the reference plane when the rings are mounted in the body member with the bearing surface of the outer ring engaging the bearing surface of the body member. Thus, the optical axis of the objective, if the objective is properly mounted in one of the rings, will be perpendicular to the reference plane in all adjusted positions of the rings.

In the assembly of binoculars embodying the lens mounting of the present invention, the annular seats of the body members are uniformly bored to a depth sufficient to hold the lens mountings in the body members. The present invention will, therefore, eliminate the individual reboring of the body members, or the placing of shims or spacing members on the seats of the body members, to compensate for variations in the focal lengths of the objectives and permit the use of standard body members in which the seats are spaced at a uniform and constant distance from the objective ends of the body members. Thus, the assembly of the objectives with the body members is greatly simplified and the time taking and expensive operations heretofore necessary are eliminated resulting in a substantial saving in the manufacturing costs of precision instruments.

Other objects and advantages of the present invention will appear from the following description taken in connection with the accompanying drawing in which.

For purposes of illustration, I have shown my adjustable lens mounting embodied in a binocular, although its applicability to other optical instruments will be understood by those familiar with the art.

Figure 1:
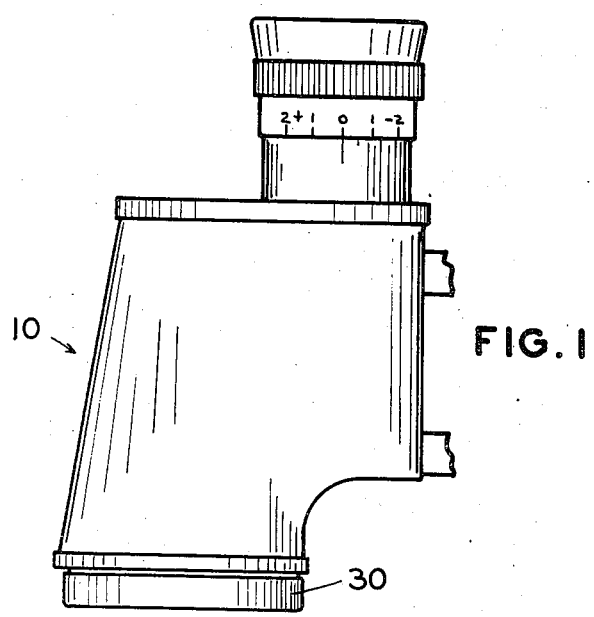
Fig. 1 is a front elevation of a body tube of a binocular.
Figure 2:
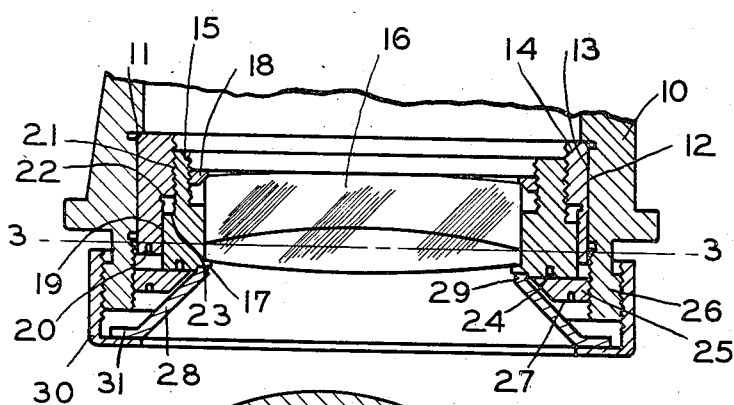
Fig. 2 is an enlarged vertical sectional view of an objective lens assembly in the binocular body tube, embodying the lens mounting of the present invention.
Figure 3:
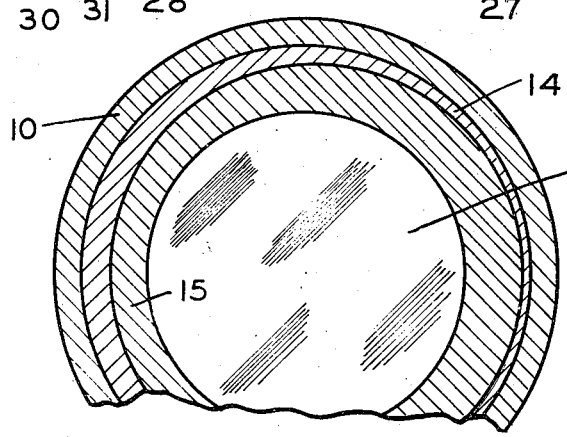
Fig. 3 is a horizontal section on line 3—3 of Fig. 2.

In the illustrated embodiment of the present invention, referring to Figs. 1 and 2, the one end of the body member or tube 10 is closed by an eyepiece assembly now customarily used in binoculars. The other end of the tube 10 is closed by an objective assembly having an annular surface engaging an annular seat 11 which is accurately machined to be parallel with a predetermined reference plane of the body.

The end of the tube 10 is formed with an internal annular bearing surface 12 slidably engaged by a bearing surface 13 of an outer ring 14 of the objective assembly. These engaging surfaces are formed so that they are perpendicular to the seat 11. The ring 14 is formed with an eccentric opening receiving a ring 15, in which is eccentrically mounted an objective lens 16.

The lens 16 is held against the one face of an inturned flange 17 of the ring 15 by means of a locking member 18 threaded into an opening in the ring 15.

The wall of the opening of the ring 14 forms a concentric bearing surface slidably engaging a complemental surface 19 formed on the outer wall of the ring 15. The ring 15 is mounted within the ring 14 for coaxial movement through engagement of complemental concentric threaded surfaces 21 on the contacting portions of the rings. These bearing and threaded surfaces 19 and 21, respectively, are divided by a shoulder 22 of the ring 14 and a shoulder 23 of the ring 15. The shoulders 22 and 23 limit the upward longitudinal displacement of the lens 16 along the axis of the tube 10. In order to permit the rings 14 and 15 to be turned, the peripheries of the rings are provided with spaced slots 20 and 24 which can be engaged by suitable tools for rotating the rings.

To insure that the optical axis of the lens 16 will remain parallel to the optical axis of the eyepiece lens in all adjusted positions of the rings 14 and 15, the engaging surfaces 12 and 13 of the body tube 10 and the engaging surfaces of the rings 14 and 15 are accurately machined perpendicular to a reference plane determining the optical axis of the eyepiece lens.

The longitudinal movement of the lens 16 along the optical axis of the eyepiece lens is effected by the relative longitudinal movement of the rings 14 and 15. In the embodiment of the invention now preferred, the rings 14 and 15 effect this movement through the engagement of their concentric threaded surfaces 21. The rings are held in alignment as they are longitudinally moved through the engagement of their concentric bearing surfaces 19 which are accurately machined so that these surfaces will also be perpendicular to the reference plane.

Thus, the optical axis of the lens 16, when the lens is properly mounted in the ring 15, will be perpendicular to the reference plane in all adjusted positions of the rings 14 and 15.

The adjustment of the objective lens 16 for the purpose of collimating the optical system of the binocular body tube 10 is effected in the following manner. To secure the desired coincidence of the focal plane of the objective lens 16 with the focal plane of the eyepiece lens, either of the rings 14 or 15 may be rotated relative to the other. The longitudinal movement of the lens 16 along the optical axis of the eyepiece lens to position their focal planes in coincidence is brought about by the engagement of the concentric threaded surfaces 21 of the rings 14 and 15. Movement of either of the rings 14 or 15 relative to each other will cause the ring 15 to move the objective lens 16 longitudinally along the optical axis of the eyepiece lens to a position where their focal planes are coincident. It can be readily appreciated that any variation in the focal length of the objective lens 16 causing a maladjustment between the necessary coincidence of the focal planes of the lens 16 and the eyepiece lens may be easily cured by the objective assembly embodying the lens mounting of the present invention.

To now position the optical axis of the lens 16 concentric with the optical axis of the eyepiece lens, the lens 16 is then moved in eccentric paths in a plane perpendicular to the optical axis of the eyepiece lens by rotation of the rings 14 and 15 either relative to each other or as a unit relative to the body tube 10 to thereby bring the optical axis of the objective lens 16 into concentricity with the optical axis of the eyepiece lens. When it is necessary to secure the alignment of the optical axis of the objective lens with that of the eyepiece lens by the rotation of either of the rings relative to each other, it may be secured by a half turn, or less, of either of these rings relative to each other. The movement of the ring 15 is insufficient to cause displacement of the coincident focal planes of the objective and eyepiece lenses to any substantial extent impairing the optical efficiency of the binocular.

Thus, the lens mounting of the present invention permits the objective lens 16 to be adjusted along perpendicular and longitudinal axes, relative to the optical axis of the eyepiece lens system, each one of these adjustments being independent of the other.

The present invention is advantageously used in connection with an optical instrument in which an adjustably mounted ocular tube carries a band having a scale cooperable with an index or fiducial indicia on the instrument to indicate the position of the ocular tube. In the preferred embodiment of the invention, the collimation of the lens system of the binocular is secured by turning the ocular tube until it is positioned midway between its limits of travel and a graduation mark is then placed on the ocular mounting tube in registry with the zero point of the band. In this manner, the band will be positioned midway between its maximum plus and minus diopter readings. The focal plane of the ocular lens system will thereby be fixed in the binocular. To collimate the lens systems of the binocular, a collimating system is used in conjunction with the lens systems so that parallel light rays entering the objective lens system will issue parallel from the ocular lens system by bringing the focal planes of the objective lens system and the ocular lens system into coincidence. To secure the collimation of the lens systems in the binocular, the objective lens system 16 is moved longitudinally and perpendicularly of the optical axis of the ocular lens system by the lens mounting of the present invention until the desired coincidence of the focal planes of the objective lens system 16 and the ocular lens system, as well as the concentricity of the optical axis of the objective lens system 16 with that of the optical axis of the ocular lens system, is obtained. In this manner, the collimation of the lens system of the binocular is readily and easily secured.

The lens mounting in its preferred embodiment is also advantageous in positioning a graticule in a binocular in the focal plane of the objective lens system 16 so that the graticule is optically located at infinity, a customary practice for avoiding parallax. By the utilization of the lens mounting of the present invention in a binocular, the graticule may be invariably fixed in the same location on the optical axis of the body tube of the binocular as the coincidence of the graticule indicia and the focal plane of the objective lens system 16 may be readily and easily obtained by moving the objective lens system 16 longitudinally along the optical axis of the ocular lens system until the graticule indicia and the image of the object are in focus. In this manner, the lens mounting of the present invention obviates many of the difficulties had in prior practice where the objective lens systems were fixed against longitudinal movement along the optical axis of the ocular lens systems.

To complete the assembly of the objective lens mounting after the objective lens is positioned in the body tube 10, the eccentric rings are secured in place by a locking ring 25 which screws into the inner surface of a threaded extension 26 of the body tube 10 and bears against the bottom of the ring 15. To permit this locking action of the ring 25, spaced slots 27 are provided in the ring 25 which can be engaged by suitable tools for turning the ring. By so doing, the ring 25 forces the ring 14 against the seat 11 of the body tube 10 through the threaded engagement of the eccentric rings. As a result, the objective lens will be immovably positioned in the body tube in its adjusted position. A cover member 28 has a flange 29 on its inner peripheral edge adapted to fit under the annular internal flange 17 to thereby assist in the locking of the objective in its determined position.

To secure the cover member 28 firmly in place against the bottom of the flange 17, an upturned peripheral flange of a cap member 30 screws onto an outer annular surface of the threaded extension 26 and an internal annular flange portion of the member 30 seats upon a flange 31 of the cover member 28. By the assembly means described above, the objective lens is securely held in position and the optical elements within the tube 10 are protected from dust and other foreign matter impairing their efficiency.

It is readily apparent in the present embodiment of the invention, that the objective lens 16 may also be adjusted to bring its focal plane into coincidence with a reference point on the optical axis of the lens system of the binocular, other than that of the focal plane of the eyepiece lens. Furthermore, as any lens can be used in the lens mounting and the mounting used in any optical instrument to secure these novel results, the lens mounting of the present invention is not limited to the use shown in a binocular but may be used in any optical instrument.

From the foregoing, it will be apparent that I am able to attain the objects of my invention and have provided a novel adjustable lens mounting for field glasses, binoculars, and the like, that is capable of being adjusted along perpendicular and longitudinal axes, relative to the optical axis of the lens, to thereby position its focal plane in coincidence with a reference point on the optical axis of an optical instrument and also to position its optical axis concentric with the optical axis of the instrument.

Various modifications can obviously be made without departing from the spirit of my invention or the scope of the appended claims.

I claim:

1. In an optical instrument, a body member; optical means carried at one end of said member having a fixed optical axis; an internal annular bearing portion at the other end of said member; an eccentric ring fitting within said bearing portion; lens means; and means for mounting said lens means and fitting within said eccentric ring, said mounting means and ring having concentric engaged threaded and bearing portions, the lens means being eccentrically disposed within said mounting means, relative rotation of said ring and said mounting means moving said lens means longitudinally and perpendicularly of the optical axis of said optical means whereby the focal plane of said lens means may be brought into a predetermined position relative to the focal plane of said optical means and the optical axis of said lens means may be brought into coincidence with the optical axis of said optical means.

2. In an optical instrument, a body member; optical means carried at one end of said member having a fixed optical axis; an internal annular bearing portion at the other end of said member; an eccentric ring fitting within said bearing portion; lens means; and a ring mounting said lens means and fitting within said eccentric ring through engagement of complemental concentric threads and bearing portions formed on their contacting surfaces, said lens means being eccentrically disposed within said second-named ring, the relative rotation of said rings moving said lens means longitudinally of the optical axis of said optical means whereby the focal plane of said lens means may be brought into a predetermined position relative to the focal plane of said optical means and perpendicularly in a plane transverse to the optical axis of said optical means whereby the optical axis of said lens means may be brought into coincidence with the optical axis of said optical means.

3. In an optical instrument, a body member; optical means carried at one end of said member having a fixed optical axis; internal annular bearing portions at the other end of said member; a ring fitting within one of said bearing portions, the other of said portions engaging said ring to restrain upward longitudinal movement of said ring axially of said member, the outer and inner annular surfaces of said ring being eccentrically formed relative to each other; lens means; a ring mounting said lens means and fitting within said eccentric ring through engagement of complemental concentric threaded and bearing portions formed on their contacting surfaces, said lens means being eccentrically disposed within said second-named ring, the relative rotation of said rings moving said lens means longitudinally and perpendicularly of the optical axis of said optical means whereby the focal plane of said lens means may be brought into a predetermined position relative to the focal plane of said optical means and the optical axis of said lens means may be brought into coincidence with the optical axis of said optical means; and means for securing said lens means in said positions.

4. In an optical instrument, a body member; optical means carried at one end of said member having a fixed optical axis; internal annular bearing portions at the other end of said member; an eccentric ring fitting within said bearing portion, the other of said portions engaging said ring to restrain upward longitudinal movement of said ring axially of said member, the outer and inner annular surfaces of said ring being eccentrically formed relative to each other; lens means; a ring mounting said lens means and fitting within said eccentric ring through engagement of complemental concentric threaded and bearing portions formed on their contacting surfaces, said lens means being disposed within said second-named ring, the outer and inner annular surfaces of the second-named ring being eccentrically formed relative to each other to eccentrically dispose said lens means within said second-named ring, the relative rotation of said rings moving said second-named ring coaxially of said eccentric ring through the threaded and bearing engagement of said rings and moving said eccentric ring on the internal bearing portion of said member to thereby move said lens means longitudinally and perpendicularly of the optical axis of said optical means whereby the focal plane of said lens means may be brought into a predetermined position relative to the focal plane of said optical means and the optical axis of said lens means may be brought into coincidence with the optical axis of said optical means; and means for securing said lens means in said position.

5. In an optical instrument, a body member; optical means carried at one end of said member having a fixed optical axis; an eccentric ring rotatably mounted in the other end of said member, the outer and inner annular surfaces of said ring being eccentrically formed relative to each other; lens means; a ring mounting said lens means and fitting within said eccentric ring through the engagement of complemental concentric contacting surfaces of said rings, said lens means being disposed within said second-named ring, the outer and inner annular surfaces of the second-named ring being eccentrically formed relative to each other to eccentrically dispose said lens means within said second-named ring; and means interconnecting said rings whereby relative rotation of said rings moves said lens means longitudinally and transversely of the optical axis of said optical means whereby the focal plane of said lens means may be brought into a predetermined position relative to the focal plane of said optical means and the optical axis of said lens means may be brought into coincidence with the optical axis of said optical means.

CARL H. O. WITTIG.